(12) United States Patent
Perez

(10) Patent No.: US 11,440,750 B2
(45) Date of Patent: Sep. 13, 2022

(54) SOLIDS TRANS-LOADING

(71) Applicant: INV Nylon Chemicals Americas, LLC, Wilmington, DE (US)

(72) Inventor: Michael A. Perez, Victoria, TX (US)

(73) Assignee: INV Nylon Chemicals Americas, LLC, Wilmington, DE (US)

(*) Notice: Subject to any disclaimer, the term of this patent is extended or adjusted under 35 U.S.C. 154(b) by 15 days.

(21) Appl. No.: 16/968,514

(22) PCT Filed: Feb. 8, 2019

(86) PCT No.: PCT/US2019/017176
§ 371 (c)(1),
(2) Date: Aug. 7, 2020

(87) PCT Pub. No.: WO2019/157258
PCT Pub. Date: Aug. 15, 2019

(65) Prior Publication Data
US 2021/0024302 A1    Jan. 28, 2021

Related U.S. Application Data

(60) Provisional application No. 62/627,942, filed on Feb. 8, 2018.

(51) Int. Cl.
*B65G 53/50* (2006.01)
*B65G 63/00* (2006.01)
*B65G 3/04* (2006.01)
*B65G 53/24* (2006.01)
*B65G 53/66* (2006.01)

(52) U.S. Cl.
CPC ............. *B65G 63/008* (2013.01); *B65G 3/04* (2013.01); *B65G 53/24* (2013.01); *B65G 53/66* (2013.01); *B65G 2814/035* (2013.01)

(58) Field of Classification Search
CPC ........ B65G 53/16; B65G 53/18; B65G 53/20; B65G 53/22; B65G 53/50; B65G 63/008; B65G 2812/1625; B65G 2814/035; B65D 88/72
USPC ................ 406/136, 137, 138, 151, 152, 153
See application file for complete search history.

(56) References Cited

U.S. PATENT DOCUMENTS

| | | | |
|---|---|---|---|
| 2,353,346 A | 7/1944 | Logan | |
| 2,418,302 A | 4/1947 | Hornbrook | |
| 3,305,142 A * | 2/1967 | Caldwell | B65D 88/72 222/195 |

(Continued)

OTHER PUBLICATIONS

International Preliminary Report n Patentability for PCT Application No. PCT/US2019/017176, dated Aug. 11, 2020, 9 pages.

(Continued)

*Primary Examiner* — Joseph A Dillon, Jr.

(57) ABSTRACT

A method and system for trans-loading solid particulates from a hopper to a storage container, by clamping a trough (110) to a discharge gate of the hopper, the trough having an open top, sides, and a bottom, a vacuum pipe (140) extending into the trough, and at least one aerator (150) located on the trough, to which is provided an aerating gas. The method further comprises at least partially evacuating the storage container to cause at least a partial vacuum therein and drawing a vacuum through a conveyor hose connected to the trough.

19 Claims, 2 Drawing Sheets

(56) References Cited

U.S. PATENT DOCUMENTS

| | | | | |
|---|---|---|---|---|
| 3,343,886 A * | 9/1967 | Kemp | ............... | B61D 7/20 406/130 |
| 3,375,942 A * | 4/1968 | Boram | ............... | B61D 7/32 406/96 |
| 3,451,724 A * | 6/1969 | Cappelli | ............... | B65G 53/30 406/137 |
| 3,469,888 A * | 9/1969 | Paule | ............... | B61D 5/006 406/85 |
| 3,527,503 A | 9/1970 | Mundinger | | |
| 3,528,570 A | 9/1970 | Pase | | |
| 3,583,768 A * | 6/1971 | Koranda | ............... | B65D 90/582 406/118 |
| 3,583,769 A | 6/1971 | Mundinger | | |
| 3,619,011 A * | 11/1971 | Doble | ............... | B65G 53/22 406/129 |
| 3,679,082 A * | 7/1972 | Gramlich | ............... | B65D 88/68 406/56 |
| 3,693,839 A * | 9/1972 | Shaver | ............... | B65D 90/587 406/128 |
| 3,708,209 A * | 1/1973 | Dugge | ............... | B65D 88/72 406/91 |
| 3,822,919 A * | 7/1974 | Strom | ............... | B65G 53/22 406/90 |
| 4,018,484 A | 4/1977 | Dugge et al. | | |
| 4,057,155 A * | 11/1977 | Deeks | ............... | B60P 1/60 406/136 |
| 4,115,929 A * | 9/1978 | Staub | ............... | B01J 8/44 34/369 |
| 4,189,263 A * | 2/1980 | Krug, Jr. | ............... | B65D 88/706 406/137 |
| 4,252,478 A * | 2/1981 | Olle | ............... | B65D 88/72 406/90 |
| 4,286,527 A * | 9/1981 | Robinson | ............... | F23J 3/06 110/165 A |
| 4,413,758 A * | 11/1983 | Walters | ............... | B65G 53/22 222/195 |
| 4,440,528 A * | 4/1984 | Mowatt-Larssen | .... | B65G 53/22 406/90 |
| 4,496,076 A | 1/1985 | Tompkins | | |
| 4,787,782 A * | 11/1988 | Younger | ............... | B65G 53/30 406/138 |
| 4,830,546 A * | 5/1989 | Withiam | ............... | B60P 1/60 105/247 |
| 4,846,377 A * | 7/1989 | Fix | ............... | B65G 53/22 222/195 |
| 4,880,148 A * | 11/1989 | Schmidt | ............... | B65D 88/72 222/195 |
| 4,934,569 A * | 6/1990 | Womack, Jr. | ............... | B65D 88/70 222/195 |
| 4,934,877 A * | 6/1990 | Haverick | ............... | B65D 88/706 220/314 |
| 5,096,096 A * | 3/1992 | Calaunan | ............... | B65G 53/22 222/185.1 |
| 5,110,366 A * | 5/1992 | McGregor | ............... | B65G 53/30 134/166 R |
| 5,205,094 A * | 4/1993 | Holmqvist | ............... | B65D 88/72 52/192 |
| 5,248,227 A * | 9/1993 | Hidock | ............... | B60P 1/60 406/108 |
| 5,251,763 A * | 10/1993 | Morris | ............... | A24B 1/04 209/136 |
| 5,325,548 A * | 7/1994 | Forbes | ............... | A01J 7/025 134/166 R |
| 6,508,611 B2 * | 1/2003 | Eckel | ............... | B60P 1/62 406/41 |
| 6,662,953 B1 * | 12/2003 | Rouse | ............... | B65D 88/70 209/682 |
| 6,666,628 B1 * | 12/2003 | Tilley | ............... | B65D 88/72 406/137 |
| 3,066,911 A1 | 11/2011 | Gatherar et al. | | |
| 9,643,799 B2 * | 5/2017 | McIlrath | ............... | B65G 53/50 |
| 2014/0261070 A1 | 9/2014 | McLaughlin et al. | | |
| 2014/0286716 A1 * | 9/2014 | Cochrum | ............... | B65G 53/16 406/122 |
| 2015/0368039 A1 * | 12/2015 | Cochrum | ............... | B65D 88/32 406/75 |

OTHER PUBLICATIONS

International Search Report and Written Opinion for PCT Application No. PCT/US2019/017176, dated May 16, 2019, 13 pages.

\* cited by examiner

SOLIDS TRANS-LOADING

RELATED APPLICATION

This application claims priority to PCT Application No. PCT/US19/17176, filed on Feb. 8, 2019, which claims priority to U.S. Provisional Application No. 62/627,942 filed on Feb. 8, 2018, which are incorporated herein by reference in their entirety.

FIELD

This invention relates to improved devices and methods for trans-loading solid particulates from a vertical hopper into a storage container.

ENVIRONMENT

Many bulk-carrying containers, such as railroad hopper cars, typically contain a funnel-shaped discharge outlet or "hopper" on an underside so that bulk cargo, such as, for example, grain, cement powder, fly ash and coal, can be quickly discharged through the underside. Thus, an apparatus for receiving the bulk cargo as it is discharged through the hopper is necessary to collect and channel the bulk cargo as it is discharged. To this end, attempts have been made to provide an apparatus that connects to the hopper at the underside of the bulk-carrying containers that receive the bulk cargo as it is discharged and channel the bulk cargo to a desired location, such as a storage tank, transport vehicle, silo, or the like.

Fine solids of adipic acid (AA) product are conventionally loaded/unloaded using a bulky, expensive loading/unloading pit, conveyors and auger system. In one system, the AA is dropped from a hopper bottom of a railcar into a pit, and is lifted with an auger and dropped into the top of a bulk truck.

One problem of such fine solids loading/unloading is that these bulk particles tend to stick under compaction pressure in the container load, heaps, etc., and lumps form which then clog up the ports, exits and flowlines. Mechanical vibration needs to be applied to screws or augers to de-lump the particles to avoid frequent operation interruptions. This issue gets even more exaggerated for solids with high sticking tendency due to many factors, e.g. surface charge, hygroscopic nature, irregular shapes, etc.

Pressure-type and vacuum-type pneumatic conveyors have been developed in which an adaptor is attached to the hopper discharge gates of the railroad car. One or more pneumatic hoses are attached to the adaptor and the material is gravity-fed into the adaptor and conveyed away in the hoses via an airstream directed therethrough. While such pneumatic conveyors have represented a pronounced improvement over the fixed mechanical or gravity conveyors in sunken pits, a number of problems remain.

For example, when trans-loading solids with high sticking tendencies, the solids can exit the hopper discharge gates in lumps, which can block the pneumatic hoses and stop the process.

It would be advantageous if an inexpensive, portable pneumatic conveyor system could be developed to efficiently trans-load solid particulates with high sticking tendencies directly from a hopper discharge gate into a storage container.

SUMMARY

Provided is a trans-loading system for solid particulates, comprising a trough having an open top, sides and a bottom, at least one vacuum pipe extending into the trough near the bottom, and at least one aerator located on the trough.

In one form, the trough has angled sides which converge at the bottom.

In another form, the sides extend from end panels on either end of the trough, and the end panels are either generally vertical or are angled.

In yet another form, the trough has a cross-section F (see FIG. 4), wherein cross-section F is generally V-shaped, or generally U-shaped, or is generally trapezoidal.

In yet another form, the vacuum pipe extends through at least one end panel.

In one form, the trough is an inverted pyramid.

In another form, the trough is a V-shaped trough, having angled sides extending from vertical end panels on either end of the trough. Optionally, in this form, the trough can further comprise one or more doors sized to at least partially cover the open top of the V-shaped trough, slidably positioned within grooves along tops of the end panels, which doors are slidable to vary an opening width of the trough.

In another form, the trough is an inverted, truncated cone.

In any of these forms, the bottom of the trough can be angled, such as by sloping from one side to the other, or by sloping from the middle of the trough to the ends.

Advantageously, in any of these forms, the trough has more than one aerator, and can also have at least one intake air pipe extending into the trough.

In any of these forms, a length or a diameter at the top of the trough is approximately a width of a railcar hopper discharge gate.

Conveniently, the vacuum pipe has a connection nozzle at an end thereof, outside of the trough.

Also provided is a method of trans-loading solid particulates from a hopper to a storage container, comprising (1) clamping a trough to a discharge gate of the hopper, the trough having an open top, sides and a bottom, at least one vacuum pipe extending into the trough near the bottom, and at least one aerator located on the trough; (2) at least partially evacuating the storage container to cause at least a partial vacuum therein; (3) applying vacuum to the vacuum pipe through a vacuum conveyor hose attached on a first end to the vacuum pipe and on a second end to the evacuated storage container; (4) applying a gas pressure to the aerator; (5) opening the hopper discharge gate to permit the solid particulates to fall into the trough; and (6) conveying the solid particulates through the vacuum hose and into the storage container.

In one form, the method further comprises adjusting one or more doors sized to at least partially cover the open top of the trough, the doors slidably positioned on the top of the trough, to match an opening width of the trough to an opening of the hopper discharge gate, prior to clamping the trough to the discharge gate.

In another form, the method further comprises controlling a level of vacuum within the trough by varying openings in at least one air intake pipe extending into the trough.

In some forms, the storage container is one of a silo, a self-loading trailer or a packaging bag.

Additionally, the gas supplied to the aerator is one of $N_2$, air, $CO_2$, Ar, other inert gas, or combinations thereof.

In another form, the aerator(s) is located on the sides of the trough or at the bottom of the trough, or both.

Also provided is a trans-loading system for solid particulates, comprising a V-shaped trough having two angled side panels which converge at a bottom and first and second vertical end panels, a vacuum pipe extending from outside the V-shaped trough and through the first end panel, and a series of aerators located along each angled side panel.

In one form, the trans-loading system further comprises one or more doors sized to at least partially cover an open top of the V-shaped trough, slidably positioned within grooves along tops of the end panels, which doors are slidable to vary an opening width of the trough.

In another form, the trans-loading system further comprises at least one intake air pipe extending into the V-shaped trough.

Conveniently, the length of the V-shaped trough is approximately the width of a railcar hopper discharge gate.

In yet another form, the vacuum pipe has a connection nozzle at an end outside of the first end panel.

Also presented is a method of trans-loading solid particulates from a hopper to a storage container, comprising clamping a V-shaped trough to a discharge gate of the hopper, the V-shaped trough having two angled side panels which converge at a bottom and first and second vertical end panels, a vacuum pipe extending from outside the V-shaped trough and through the first end panel, and a series of aerators located along each angled side panel. The method further includes at least partially evacuating the storage container to cause at least a partial vacuum therein, applying vacuum to the vacuum pipe through a vacuum conveyor hose attached on a first end to the vacuum pipe and on a second end to the evacuated storage container, applying air pressure to the aerators, opening the hopper discharge gate to permit the solid particulates to fall into the V-shaped trough, and conveying the solid particulates through the vacuum hose and into the storage container.

In another form, the method further comprises adjusting one or more doors sized to at least partially cover an open top of the V-shaped trough, slidably positioned within grooves along tops of the end panels, to match an opening width of the trough to an opening of the hopper discharge gate, prior to clamping the V-shaped trough to the discharge gate.

In yet another form, the method further comprises controlling a level of vacuum within the V-shaped trough by varying openings in at least one air intake pipe extending through the second end panel.

Conveniently, the storage container is one of a silo, a self-loading trailer or a packaging bag.

BRIEF DESCRIPTION OF THE DRAWINGS

The present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein.

This disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles. Further where considered appropriate, reference numerals may be repeated among the drawings to indicate corresponding or analogous elements. Moreover, two or more blocks or elements depicted as distinct or separate in the drawings may be combined into a single functional block or element. Similarly, a single block or element illustrated in the drawings may be implemented as multiple steps or by multiple elements in cooperation.

The forms disclosed herein are illustrated by way of example, and not by way of limitation, in the figures of the accompanying drawings and in which like reference numerals refer to similar elements and in which:

FIG. 1 is a perspective view of the trans-loading system described herein;

FIG. 2 is a top view of the trans-loading system described herein;

FIG. 3 is a top view of one alternative form of the trans-loading system described herein;

FIGS. 4 through 4F show other alternative forms of the transloading system described herein, with FIGS. 4A to 4D showing cross-sectional views from plane "F" in FIG. 4, and FIGS. 4E and 4F showing side views from plane "S" in FIG. 4;

FIG. 5 shows another alternative form of the transloading system described herein; and FIG. 6 shows another alternative form of the transloading system described herein.

DETAILED DESCRIPTION

Figure 1:
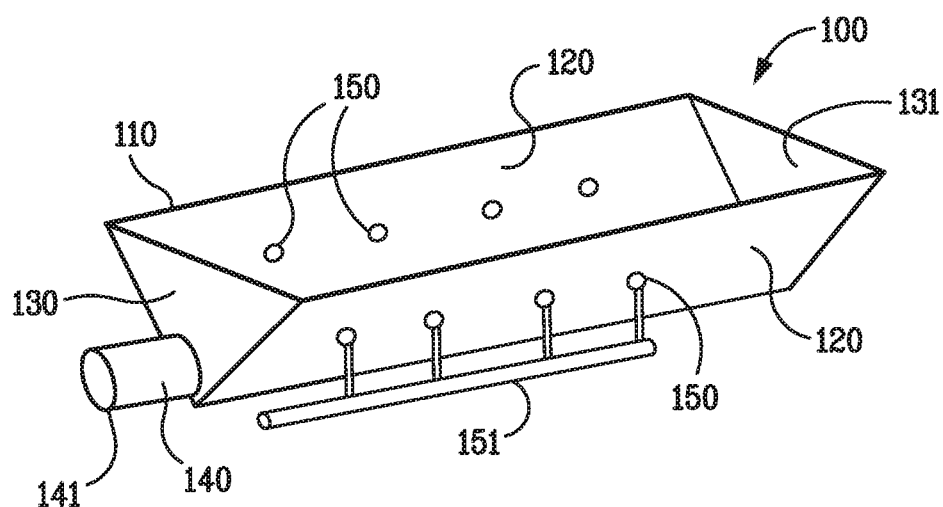

Various aspects will now be described with reference to specific forms selected for purposes of illustration. It will be appreciated that the spirit and scope of the apparatus, system and methods disclosed herein are not limited to the selected forms. Moreover, it is to be noted that the figures provided herein are not drawn to any particular proportion or scale, and that many variations can be made to the illustrated forms.

Each of the following terms written in singular grammatical form: "a," "an," and "the," as used herein, may also refer to, and encompass, a plurality of the stated entity or object, unless otherwise specifically defined or stated herein, or, unless the context clearly dictates otherwise. For example, the phrases "a device," "an assembly," "a mechanism," "a component," and "an element," as used herein, may also refer to, and encompass, a plurality of devices, a plurality of assemblies, a plurality of mechanisms, a plurality of components, and a plurality of elements, respectively.

Each of the following terms: "includes," "including," "has," "having," "comprises," and "comprising," and, their linguistic or grammatical variants, derivatives, and/or conjugates, as used herein, means "including, but not limited to."

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

Moreover, for stating or describing a numerical range, the phrase "in a range of between about a first numerical value and about a second numerical value," is considered equivalent to, and means the same as, the phrase "in a range of from about a first numerical value to about a second numerical value," and, thus, the two equivalently meaning phrases may be used interchangeably.

It is to be understood that the various forms disclosed herein are not limited in their application to the details of the order or sequence, and number, of steps or procedures, and sub-steps or sub-procedures, of operation or implementation of forms of the method or to the details of type, composition, construction, arrangement, order and number of the system, system sub-units, devices, assemblies, sub-assemblies, mechanisms, structures, components, elements, and configurations, and, peripheral equipment, utilities, accessories, and materials of forms of the system, set forth in the following illustrative description, accompanying drawings, and examples, unless otherwise specifically stated herein. The apparatus, systems and methods disclosed herein can be practiced or implemented according to various other alternative forms and in various other alternative ways.

It is also to be understood that all technical and scientific words, terms, and/or phrases, used herein throughout the present disclosure have either the identical or similar meaning as commonly understood by one of ordinary skill in the art, unless otherwise specifically defined or stated herein. Phraseology, terminology, and, notation, employed herein throughout the present disclosure are for the purpose of description and should not be regarded as limiting.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds). In the figures, like numerals denote like, or similar, structures and/or features; and each of the illustrated structures and/or features may not be discussed in detail herein with reference to the figures. Similarly, each structure and/or feature may not be explicitly labeled in the figures; and any structure and/or feature that is discussed herein with reference to the figures may be utilized with any other structure and/or feature without departing from the scope of the present disclosure.

In one form, disclosed is an improved trans-loading system for trans-loading solid particulates, especially fine particles or powders, from a hopper to another storage container, such as a trailer of a tractor-trailer, or a silo, or even a product packaging bag.

Many bulk-carrying containers, such as railroad hopper cars, typically contain a funnel-shaped discharge outlet or "hopper" on an underside so that bulk cargo, such as, for example, sand, soda ash, fly ash, salt particles, coating granules, fine metal particles, grains, pulverized coal, cement powder, and the like, can be quickly discharged through the underside. Thus, an apparatus for receiving the bulk cargo as it is discharged through the hopper is necessary to collect and channel the bulk cargo as it is discharged. However, a problem with loading/unloading such fine solids is that these bulk particles can tend to stick together under compaction pressure due to many factors, e.g. surface charge, hygroscopic nature, irregular shapes, etc., and lumps form which then clog up the ports, exits and flow lines.

Very small particles (fines) negatively impact the loading/unloading characteristic in conventional trans-loading systems. In the disclosed system, aeration of the solids as they are sucked out under mild vacuum overcomes any potential plugging and lumping when large amounts of fines are present. The solid particles are continuously in motion, thereby reducing their agglomeration and compaction.

The flowability of the solid particles is sometimes determined from an angle of repose, which is the maximum angle at which a granular material can rest on an inclined plane [of its heap] without sliding down. At this angle, the material on the slope face of the heap is on the verge of sliding. The angle of repose can range from 0° to 90°. Materials with a low angle of repose)(<30° form flat heaps and are very free-flowing. On the other hand, materials with high angle of repose)(>45° form tall heaps and are sluggish to flow. Factors affecting the angle of repose include material morphology (smooth, rounded, rough, interlocking particles), moisture content (hygroscopicity), density, particle surface area, shapes and size distribution, and the friction coefficient of the material. Some examples of common angles of repose are 22° (glass beads), 27° (wheat), 30-40° (corn flour), 34° (dry sand), 40° (ashes).

The angle of repose for adipic acid (powder) is 30-40° [https://www.omega.com/green/pdf/MaterialChar_Guide.pdf]. While the adipic acid powders may be somewhat flowable, the presence of large % of fines in the adipic acid along with its platelet-like crystal shapes, size distributions and hygroscopic nature makes the product difficult to flow during shipping/handling and loading/unloading large container loads.

Industrial adipic acid products come in the following ranges
- average particle sizes [$D_{50}$] range between 100-450 micrometers
- % fines (below 75 microns) range between <5 to 25 (vol. %) and in some cases as high as 45 vol. %
- bulk density ranges between 721-881 $kg/m^3$
- % fines vary with the mean particle size (in micrometers) as below:

| Mean Particle Size (micrometers) | Fines (vol. %) |
| --- | --- |
| 350-450 | <5% |
| 250-350 | 5-10% |
| 200-300 | 10-15% |
| 150-200 | 15-25% |

The presently disclosed system solves this problem for such difficult to flow products, and can be used to transfer a wide variety of finely divided solids. The system can be designed depending on the bulk shipping containers used, and the vacuum and aeration gas supply conditions can be adjusted depending on the particle sizes to be trans-loaded. For example, the presently disclosed system can accommodate particles with mean particle sizes from about 10-5000 micrometers, such as from about 10-1000 micrometers, or from about 20-800 micrometers, or even from about 25-700 micrometers.

Figure 2:
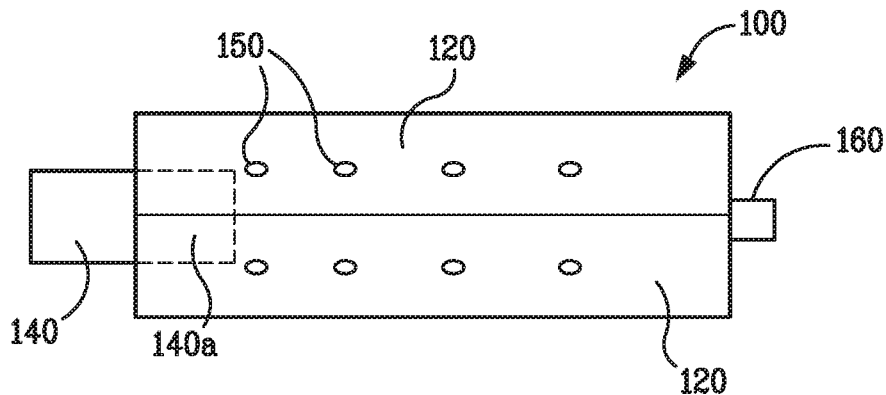
Figure 3:
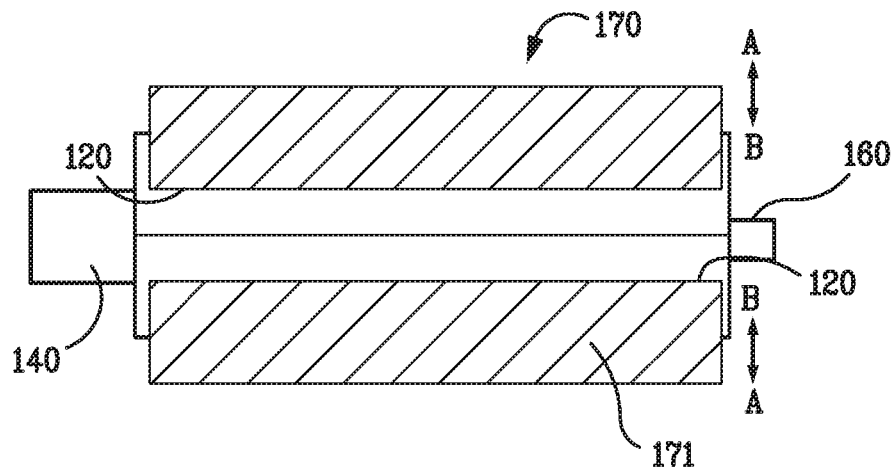

Referring to FIGS. 1-3, the improved trans-loading system 100 for solid particulates includes an open top, a V-shaped trough 110 having two angled side panels 120 which converge at a bottom centerline. The internal angle between the side panels 120 can be varied to accommodate different particles/powders based upon their size, shape and/or stickiness. For example, the internal angle can be from about 60° to about 150°, or from about 80° to about 140°, or even from about 100° to about 130°. However, in railroad hopper car applications, the angle of the side panels can be limited by the available under-car space. When not constrained by overhead space, the internal angle of the side panels can vary from about 0° (parallel) to about 170°.

The V-shaped trough also has first and second vertical end panels 130, 131 respectively and a vacuum pipe 140 extending from outside the V-shaped trough 110, through the first end panel 130. Optionally, as illustrated by the dashed lines in FIG. 2, the vacuum pipe 140*a* can extend into the V-shaped trough 120. Conveniently, the length of the V-shaped trough is approximately the width of a railcar hopper discharge gate.

The vacuum pipe 140 has a nozzle 141 that is connectable to a vacuum conveyor hose (not shown) at one end and to a suitable receiver or storage container at the other end of the hose. The solid particulates are drawn by vacuum through the vacuum hose and into the storage container. Advantageously, the diameter of the vacuum pipe 140 can be from about 2.5 cm to about 15.0 cm, or from about 5.0 cm to about 12.5 cm, or even from about 7.5 cm to about 12.5 cm. The level of vacuum applied to the vacuum pipe can vary from about 1.2 kPa to about 5.0 kPa, but higher levels of vacuum may be needed for longer vacuum hoses.

The V-shaped trough also has at least one, or a series of aerators 150 located along each angled side panel 120, which are connected to a pressurized gas header pipe 151, to supply them with pressurized gas. Without wishing to be bound by theory, it is believed that the aerators aid both in breaking up any lumps which may be dropped into the trough, and in fluidizing the solid particulates, making them easier to transport through the vacuum hose and into the storage container. A suitable aerator is the Solimar Transport Fluidizer, available from Integrated Transfer Solutions, PTY, LTD of Victoria Australia. Suitable gases which can be supplied to the aerator are $N_2$, air, $CO_2$, Ar, other inert gases, or combinations thereof. The number of aerator rows which can be used can vary by application. For example, the number of aerator rows on a side panel can be from 1 to 5, or from 1 to 4, or from 1 to 3, or even just a single row. The number of aerator holes/devices in each row can be from 1 to 10, or from 2 to 8, or from 2 to 6, or from 2 to 5. The holes can vary in diameter from about 0.6 cm to about 7.5 cm. The diameter of the header pipe 151 can range from about 0.6 cm to about 15.0 cm.

In the alternative, the gas supply system can be designed as a grid (not shown), similar to a gas sparger, at the inside bottom of the trough 110, which is connected to the gas supply header pipe.

In another form, the trans-loading system can have one or more doors 170, 171, sized to at least partially cover the open top of the trough 110. In this illustrated form, the doors 170, 171 are slidably positioned within grooves along tops of the end panels 130, 131 and the doors are slidable in the directions of arrows A and B to vary the opening width of the trough 110. This variability is advantageous in conforming the opening width of the trough to match that of an overlying hopper discharge gate, since not all railcar hoppers have the same size opening. Adjusting the door opening to match the overlying hopper discharge gate acts to reduce vacuum loss within the system. Because of the slidable doors, a single trans-loading system can be used on almost any of the various sized hopper discharge gates.

The trans-loading system also has at least one intake air pipe 160 extending into the trough, such as through the second end panel 131, to provide make-up air for the trans-loading system 100 when the vacuum pipe 140 is drawing vacuum. This system provides an air path from outside the trough 110, through the trough and vacuum pipe 140 and into a vacuum conveyor hose (not shown) connecting the trans-loading system 100 to a suitable storage container (not shown). The volume of make-up air, and thereby the vacuum level within the system, can be controlled by varying the opening size of the intake air pipe with a valve or the like.

Figure 4:
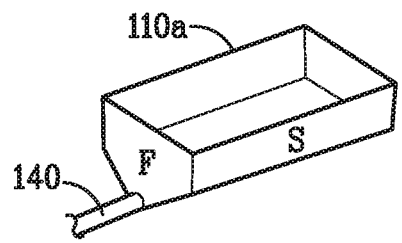
Figure 4A:
Figure 4B:
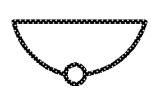
Figure 4C:
Figure 4D:
Figure 4E:
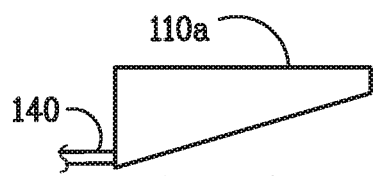
Figure 4F:
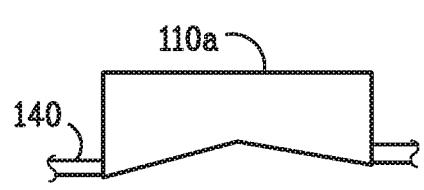

FIGS. 4 through 4F show other alternative forms of the trough. In FIG. 4, the end panel is designated F (or front) and the side panel is designated S (or side), and the alternative trough designs are designated 110*a*. FIG. 4A shows a view of F, which illustrates a V-shaped trough as disclosed in FIG. 1. FIG. 4B shows an alternative trough which has generally convex side panels, forming a U-shaped cross-section. FIG. 4C shows another alternative trough which has trapezoidal side panels. FIG. 4D shows another alternative trough which has concave side panels. FIGS. 4E and 4F show alternative shapes for the trough in a lengthwise direction. In FIG. 4E, the trough has a generally sloping bottom from one end panel to the other. In FIG. 4F, the trough has two oppositely sloping bottoms, with a peak in the middle, such that the solid particulates can be transferred toward both end panels simultaneously, and into vacuum pipes 140, provided on both end panels.

Figure 5:
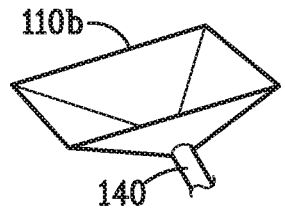
Figure 6:
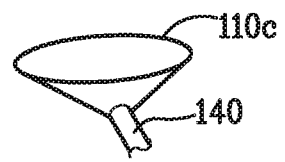

FIG. 5 shows another alternative design for the trough 110*b*, wherein both the side panels and the end panels are angled, forming an inverted pyramid. FIG. 6 shows another alternative design for the trough 110*c*, which is an inverted, truncated cone having the vacuum pipe 140 extending from near or at the bottom of the cone.

Additionally presented is a method of trans-loading solid particulates from a hopper to a storage container including clamping the trough described above to a discharge gate of the hopper. Both the trough and the hopper discharge gate have a flange or lip at outer edges thereof suitable for clamping one to the other, such as by C-clamps or the like. The storage container can be at least partially evacuated to cause at least a partial vacuum therein, and apply vacuum to the vacuum pipe of the V-shaped trough through a vacuum conveyor hose, which is attached on a first end to the vacuum pipe and on a second end to the evacuated storage container. Gas pressure from about 117 kPa to about 241 kPa, or from about 158 kPa to about 172 kPa, is applied to the aerators to aid in fluidizing the solid particulates and disperse any lumpy conglomerates of particulates. The hopper discharge gate is then opened to permit the solid particulates to fall into the V-shaped trough, and subsequently conveyed through the vacuum hose and into the storage container.

The method can also include adjusting one or more doors which are sized to at least partially cover the open top of the trough. The doors can be slidably positioned within grooves along tops of the end panels to match the width of the trough opening to the overlying hopper discharge gate opening. This step is conducted prior to clamping the trough to the discharge gate.

Since vacuum levels within the system can vary, such as due to the amount of particulate in the hopper, the method also includes controlling the vacuum level within the trough by varying openings in at least one air intake pipe entering the trough. For example, the air intake pipe can be one which extends through the second end panel of the trough. The air intake acts to form a stream of air through the trough and into the vacuum system, improving flow into the storage container.

Advantageously, the storage container can be a silo, a self-loading trailer or a packaging bag.

EXAMPLES

Example 1

A V-shaped trough (approximately 120° internal angle) having vertical end walls and a vacuum pipe (10 cm diameter) through one of the end walls was clamped to a hopper discharge gate on a railcar carrying free flow adipic acid (FFA) powder (as disclosed in U.S. Pat. No. 8,066,911). The hopper gate was opened and vacuum was applied to the V-shaped trough from a conveyor hose connected to a self-loading trailer. Transfer of the FFA powder was slow but successful.

Example 2

The V-shaped trough of Example 1 was clamped to a hopper discharge gate on a railcar carrying large grain adipic acid (LGA) powder (particle size range, $D_{10}$-$D_{90}$ (µm): 200-700; average particle size, $D_{50}$ (µm): 350-400; particles<75 µm (%): <1%). The hopper gate was opened and vacuum was applied to the V-shaped trough from a conveyor hose connected to a self-loading trailer. Transfer of the LGA powder was unsuccessful.

The failure of the system in Example 2 was surprising, since unlike FFA crystals which are irregular in shape, the LGA crystals are generally ovoid in shape, and were expected to flow freely into the system.

Example 3

The V-shaped trough of Example 1 was modified to include a series of three Solimar aerators (5 cm diameter) on each angled wall. The modified V-shaped trough was clamped to a hopper discharge gate on a railcar carrying FFA powder. Pressurized air (approximately 158 to 172 kPa) was provided to the aerators, the hopper gate was opened and vacuum (3 kPa) was applied to the V-shaped trough from a conveyor hose connected to a self-loading trailer Transfer of the FFA powder was fast and successful.

Example 4

The modified V-shaped trough of Example 3 was clamped to a hopper discharge gate on a railcar carrying LGA powder. Pressurized air was provided to the aerators, the hopper gate was opened and vacuum was applied to the V-shaped trough from a conveyor hose connected to a self-loading trailer. Transfer of the LGA powder was fast and successful.

The Table below provides a comparison between trans-loading flow rates using the conventional auger/pit method and the presently described system and method.

| Load | Loaded wt. (kg) | Time to trans-load (hrs) | Calculated Rate (kg/hr) |
|---|---|---|---|
| Truck/Trailer | 20,411 ~18.4 tonnes | 3.5-4 1.5-2 [in some cases] | 5103-5851 4.5-5.4 tonnes/hr 9.0-11.8 tonnes/hr |
| versus | | | |
| Conventional | | 8-10 | 1.8-2.3 tonnes/hr Difficulty of trans-loading |

INDUSTRIAL APPLICABILITY

The systems and methods disclosed herein are applicable to the chemical and food transportation and packaging industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed:

1. A trans-loading system for solid particulates, comprising a trough having an open top, sides and a bottom, at least one vacuum pipe extending into the trough, at least one aerator located on the trough, and one or more slidable doors sized to at least partially cover the open top of the trough.

2. The system of claim 1, wherein the sides are angled sides which converge at the bottom.

3. The system of claim 1, wherein the sides extend from end panels on either end of the trough, and the end panels are either vertical or are angled.

4. The system of claim 1, wherein the trough has a cross-section F, wherein the cross-section F is V-shaped.

5. The system of claim 3, wherein the vacuum pipe extends through at least one end panel.

6. The system of claim 1, wherein the trough is an inverted pyramid.

7. The system of claim 1, wherein the trough is a V-shaped trough and the sides are angled sides extending from vertical end panels on either end of the trough.

8. The system of claim 7, wherein the one or more slidable doors are slidably positioned along tops of the vertical end panels, and the one or more slidable doors are slidable to vary an opening width of the trough.

9. The system of claim 1, wherein the trough is an inverted, truncated cone.

10. The system of claim 1, wherein the bottom is angled.

11. The system of claim 1, further comprising more than one aerator.

12. The system of claim 1, further comprising at least one intake air pipe extending into the trough.

13. The system of claim 1, wherein a length or a diameter at the open top of the trough is approximately a width of a railcar hopper discharge gate.

14. The system of claim 1, wherein the vacuum pipe has a connection nozzle at an end thereof, outside of the trough.

15. A trans-loading system for solid particulates, comprising a V-shaped trough having two angled side panels which converge at a bottom of the V-shaped trough and first and second vertical end panels, a vacuum pipe extending from outside the V-shaped trough and through the first vertical end panel, a series of aerators located along each of the angled side panels, and one or more slidable doors sized to at least partially cover an open top of the V-shaped trough.

16. The system of claim 15, wherein the one or more slidable doors are slidably positioned along tops of the first and second vertical end panels, and the one or more slidable doors are slidable to vary an opening width of the V-shaped trough.

17. The system of claim 15, further comprising at least one intake air pipe extending into the V-shaped trough.

18. The system of claim 15, wherein a length of the V-shaped trough is approximately a width of a railcar hopper discharge gate.

19. The system of claim 15, wherein the vacuum pipe has a connection nozzle at an end outside of the first end panel.

\* \* \* \* \*